US012726940B2

(12) United States Patent
Faltaous et al.

(10) Patent No.: US 12,726,940 B2
(45) Date of Patent: Sep. 1, 2026

(54) EVENT DETECTION BASED ON SENSOR DATA

(71) Applicant: T-MOBILE INNOVATIONS LLC, Overland Park, KS (US)

(72) Inventors: Maikel E. Faltaous, Renton, WA (US); Kristopher Michael McNeil, Sammamish, WA (US); Kevin Lorne Engelbert, Mukilteo, WA (US); Barry Robert Butterklee, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 303 days.

(21) Appl. No.: 18/394,041

(22) Filed: Dec. 22, 2023

(65) Prior Publication Data

US 2025/0212166 A1 Jun. 26, 2025

(51) Int. Cl.

| | |
|---|---|
| ***H04W 4/02*** | (2018.01) |
| ***H04L 67/12*** | (2022.01) |
| ***H04W 64/00*** | (2009.01) |

(52) U.S. Cl.
CPC .......... *H04W 64/003* (2013.01); *H04L 67/12* (2013.01)

(58) Field of Classification Search
CPC ............................ H04W 64/003; H04L 67/12
USPC ...................................................... 455/456.1
See application file for complete search history.

(56) References Cited

U.S. PATENT DOCUMENTS

| | | | | |
|---|---|---|---|---|
| 2013/0150028 | A1* | 6/2013 | Akins .................. | H04W 4/029 455/456.3 |
| 2017/0359319 | A1* | 12/2017 | Kelsey ................ | H04L 63/0457 |
| 2024/0362994 | A1* | 10/2024 | Daoura ................. | G08C 17/02 |

OTHER PUBLICATIONS

IP.com search history (Year: 2025).*

* cited by examiner

*Primary Examiner* — Moustapha Diaby
(74) *Attorney, Agent, or Firm* — Shook, Hardy & Bacon L.L.P.; Elena K. McFarland

(57) ABSTRACT

Aspect herein capture methods, media, device, and systems that leverage real-time sensor data to trigger events, location tracking, and notification events using customizable configurations of a tracking device with various sensor(s).

20 Claims, 5 Drawing Sheets

EVENT DETECTION BASED ON SENSOR DATA

TECHNICAL BACKGROUND

The present disclosure generally relates to sensor-based event detection and responsive location tracking systems that leverage wireless networks.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a computerized method is provided. In accordance with the method, a tracking device is determined to be in motion using a sensor of the tracking device. Then, it is determined whether the tracking device is in motion for a time duration that meets a time duration threshold. In response to determining the time duration threshold is met, a plurality of configurations are referenced. Based on the plurality of configurations, it is determined whether the tracking device is in range for a short range wireless connection with a user device to which the tracking device is paired. In response to determining that the tracking device is not in range for the short range wireless connection with the user device to which the tracking device is paired, it is determined that an update request is to be initiated. Based on the plurality of configurations, one of a Wi-Fi network or a telecommunications network is selected for communicating the update request. Then, the updated request is generated and communicated from the tracking device to a cloud-based server using the Wi-Fi network or the telecommunications network, wherein the update request is configured to cause the cloud-based server to generate and communicate a notification to the user device.

In another aspect, one or more non-transitory computer-readable media are provided for storing instructions that when executed via one or more processors perform a computerized method. In aspects, via the media, a tracking device is determined to be in motion using a sensor of the tracking device. Then, it is determined whether the tracking device is in motion for a time duration that meets a time duration threshold. In response to determining the time duration threshold is met, a plurality of configurations are referenced. Based on the plurality of configurations, it is determined whether the tracking device is in range for a short range wireless connection with a user device to which the tracking device is paired. In response to determining that the tracking device is not in range for the short range wireless connection with the user device to which the tracking device is paired, it is determined that an update request is to be initiated. Based on the plurality of configurations, one of a Wi-Fi network or a telecommunications network is selected for communicating the update request. Then, the updated request is generated and communicated from the tracking device to a cloud-based server using the Wi-Fi network or the telecommunications network, wherein the update request is configured to cause the cloud-based server to generate and communicate a notification to the user device.

In yet another aspect, a system is provided. The system comprises a cloud-based server operating within a telecommunications network and a tracking device having one or more processors. The tracking device configured to, via the one or more processors, determining whether the tracking device is in motion using a sensor of the tracking device, and further, determining whether the tracking device is in motion for a time duration that meets a time duration threshold. In response to determining the time duration threshold is met, a plurality of configurations are referenced, and based on the plurality of configurations, it is determined whether the tracking device is in range for a short range wireless connection with a user device to which the tracking device is paired. In response to determining that the tracking device is not in range for the short range wireless connection with the user device to which the tracking device is paired, it is determined that an update request is to be initiated. Based on the plurality of configurations, a Wi-Fi network is preferentially selected over a telecommunications network for the update request based on the plurality of configurations. Then, the update request is generated and communicated from the tracking device to the cloud-based server using the Wi-Fi network or the telecommunications network, wherein the update request is configured to cause the cloud-based server to generate and communicate a notification to the user device.

In another aspect, one or more non-transitory computer-readable media are provided for storing instructions that when executed via one or more processors perform a computerized method. In accordance with the instructions on the media, a category type is received for a tracking device. A cloud-based server identifies a plurality of configurations for the tracking device that are specific to the category type. The plurality of configurations are communicated to the tracking device, wherein the plurality of configurations are automatically implemented by the tracking device. A communication is received, from the tracking device, that comprises a unique identifier and sensor data captured using the plurality of configurations implemented by the tracked device. In response to receiving the communication, a recipient device that is specific to the unique identifier is identified. Then, a notification is generated and communicated to the recipient device based on the communication that comprises the sensor data.

In one aspect, one or more non-transitory computer-readable media are provided for storing instructions that, when executed via one or more processors, perform a computerized method. In accordance with the instructions of the media, a plurality of configurations that are specific to a category type are received from a cloud-based server. A sensor of a tracking device is configured using the plurality of configurations that are specific to a category type. Sensor data is captured in near real-time by the sensor, subsequent to configuring the sensor based on the plurality of configurations that are specific to a category type. Then, an event can be detected in near real-time at the tracking device based on the sensor data. A communication that comprises a unique identifier and the sensor data captured is communicated from the tracking device to the cloud-based server in response to detecting the event.

In another aspect, a system is provided. The system comprises a tracking device having one or more processors and a cloud-based server operating within a telecommunications network. The cloud-based server is configured to receive a category type for a tracking device and to identify a plurality of configurations for the tracking device that are specific to the category type. The cloud-based server is configured to communicate the plurality of configurations to the tracking device, wherein the plurality of configurations are automatically implemented by the tracking device. The cloud-based server is configured to receive, from the tracking device, a communication that comprises a unique identifier and sensor data captured using the plurality of configurations implemented by the tracked device. In response to receiving the communication, a cloud-based server identifies a recipient device that is specific to the unique identifier. The cloud-based server further generates and communicates a notification to the recipient device based on the communication that comprises the sensor data.

BRIEF DESCRIPTION OF THE DRAWINGS

Aspects are described in detail below with reference to the attached drawings figures, wherein.

DETAILED DESCRIPTION

Figure 1:
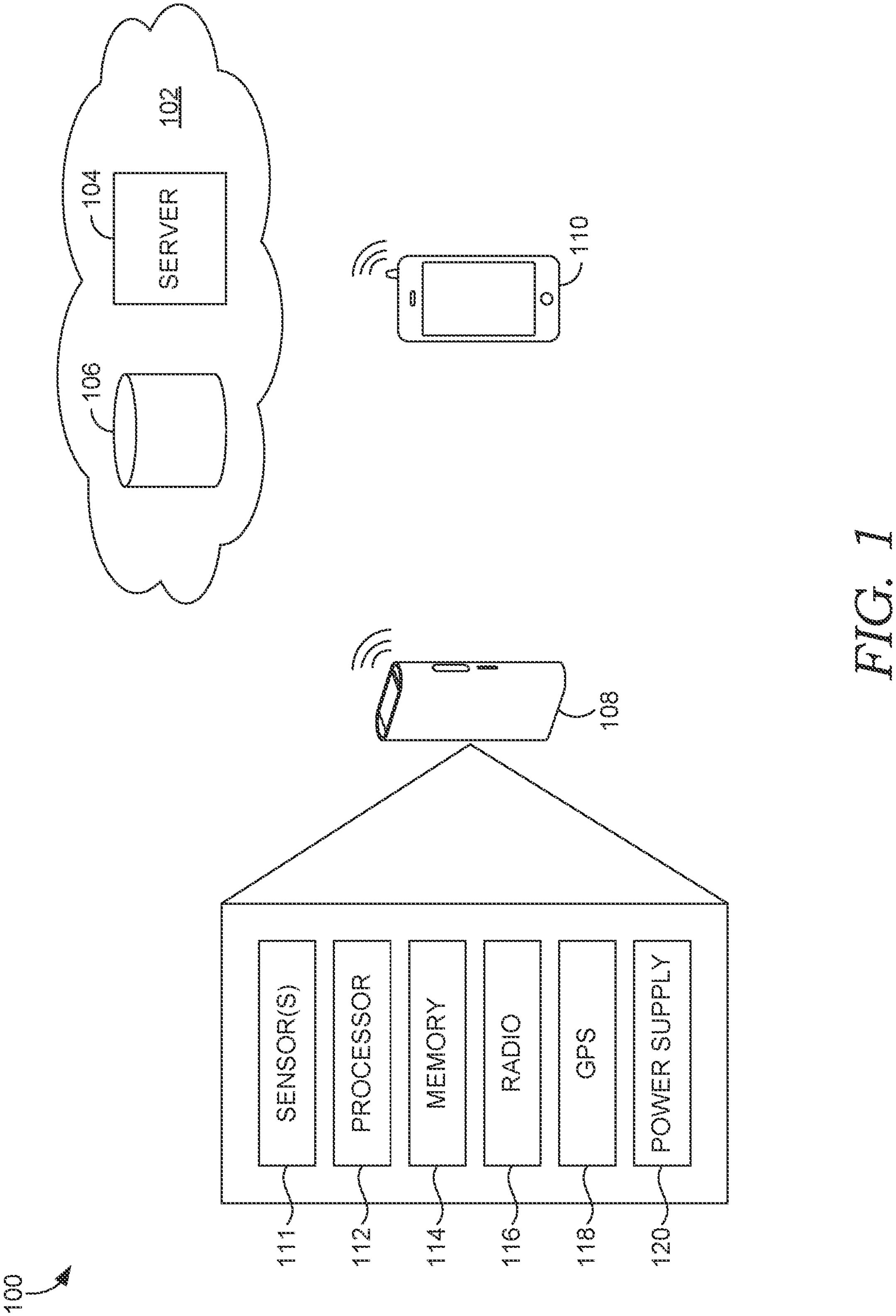
FIG. 1 depicts an example of a system environment, in accordance with one or more aspects.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3G | Third-Generation Wireless Access Technology |
| 4G | Fourth-Generation Wireless Access Technology |
| 5G/5G NR | Fifth-Generation Wireless Access Technology/New Radio |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| CU | Central Unit |
| DU | Distribution Unit |
| EIRP | Equivalent Isotropically Radiated Power |
| eNodeB | Evolved Node B |
| EVDO | Evolution-Data Optimized |
| GIS | Geographic/Geographical/Geospatial Information System |
| gNodeB/gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communication |
| iDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |
| IIOT | Industry Internet of Things |
| LED | Light Emitting Diode |
| LTE | Long Term Evolution |
| MEC | Mobile Far Edge Computer |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| mmWave | Millimeter Wave |
| NEXRAD | Next-Generation Radar |
| NR | New Radio |
| OOBE | Out-of-Band-Emission |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-&-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 500 shown in FIG. 5. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macrocell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy 7777 devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

As discussed hereinafter, a tracking device is provided that is used to physically locate and track, whether intermittently, periodically, and/or in real-time/near real-time in various aspects, an item that is associated with and co-located with the tracking device. The tracking device may be used, for example, to locate and track the movement of item(s) that are physically stationary (e.g., keys to a home, an office, or a vehicle; a wearable such as a backpack or a purse; a computing device such as a laptop or a tablet; a transportable such as a piece of luggage; or an item placed in long-term storage and/or secure storage, such as a safe) and/or items that are generally not stationary (e.g., a car, a motorcycle, a bicycle, an unmanned aerial vehicle, an animal such as a pet). The tracking device further discussed herein utilizes one or more sensor(s), hardware components, and software components to communicate location and other information through a network to a user device.

FIG. 1 depicts an example of a network environment 100, in accordance with one or more embodiments. In aspects, the network environment 100 includes a network 102, a cloud-based server 104, a database 106, a tracking device 108, and a user device 110. In various aspects, the network 102 is a telecommunications network having a plurality of access points that provide service to a plurality of user equipment, such as the tracking device 108 and the user device 110. The cloud-based server 104 and the database 106 operate within the network 102, and as further discussed, can provide service(s) to a user via the tracking device 108 and the user device 110. The server is generally a virtual server that operates in a cloud computing environment, but which is supported by individual server(s) in data centers. Although a cloud-based server is discussed herein, it will be understood that servers that are partially cloud-based or that are not cloud-based can be utilized and leveraged alone or in connection with a cloud-based server to perform aspects discussed herein. The database 106 can operate as cloud-based storage that supports a cloud-based server in a cloud computing environment as shown, or it may instead be partially cloud-based or not cloud-based, in various aspects.

The tracking device 108 (interchangeably referred to as a "tracker") is a device comprising sensor(s) 111, a processor 112, a memory 114, a radio 116, a location service module, such as a global positioning system 118, and a power supply 120. The sensor(s) 111 can include one or more sensors of the same or different kinds, such as a gyroscope, an accelerometer (e.g., for detecting and measuring movement of the tracking device 108 including speed, acceleration, deceleration, change of direction), an optical sensor (e.g., for detecting and measuring light), a temperature sensor, an atmospheric pressure sensor, a humidity or water sensor, a vibration sensor, impact sensor, the like, and/or any combination thereof. The processor 112 can be, for example, a microcontroller unit and/or a microprocessor unit, configured to operate and control hardware components of the tracking device 108, in various aspects. The memory 114 can be, for example, physical memory for storing data and computer-readable instructions for execution and implementation via the processor 112, and/or any other components of the tracking device 108. The radio 116 can be configured to send and receive wireless communications using multiple modalities, connections, and/or networks, concurrently or non-concurrently, including telecommunications, Wi-Fi, short-range wireless (e.g., Bluetooth®), Near Field Communication (NFC), and the like. The location service module, such as the global positioning system 118, is a hardware component that utilizes measurements to determine the location, direction of travel, and/or speed (e.g., velocity) of travel of the tracking device 108 in real-time or near real-time using a satellite network. The power supply 120 stores and provides energy to the tracking device 108 and its components. The power supply 120 can be, for example, a battery or other supplies discussed with regard to FIG. 5. In various aspects, the tracking device 108 includes additional features and components, such as a speaker, a light or light-emitting diode, a microphone, a modem, a low dropout regulator (LDO), and/or the like. In some aspects, the tracking device 108 operates for tracking purposes as discussed, and is not capable of, or is not configured for, handling telephone calls and/or messaging services such as Short Message/Messaging Service (SMS). As such, the tracking device 108 can be physically compact and small in size relative to user equipment such as smartphones or computing devices such as a laptop or tablet. Based on the compact dimensions, the tracking device can be physically attached to the item to be tracked using a mechanical or frictional coupling mechanism (e.g., loop and/or ring), and/or may be placed into a compartment of the item to be tracked, optionally.

In aspects, the tracking device 108 determines whether it is in motion using one or more sensors incorporated within or as part of the tracking device 108. Examples of sensors include an accelerometer or other inertial sensor(s) (e.g., to measure acceleration, shock, and/or vibration), an inclinometer, and/or a rotation sensor (e.g., angular position). For example, the tracking device 108 can detect when it goes from a state of rest to a state of motion and vice versa; therefore the tracking device 108 can detect when the tracking device 108 has begun to move, is in motion, and/or has stopped motion. The tracking device 108 can further detect and monitor its speed of motion and rates of change in speed, such as acceleration and deceleration. The tracking device 108 can further determine and/or identify the type of motion in some aspects, such as a determination that, based on the motion, speed, acceleration, vibrational patterns, frequency of a vibration, intensity, and/or direction, the motion is predicted to be associated with walking, a car driving, or the like. As such, the tracking device 108 can identify a magnitude of a motion (e.g., force of an impact can be distinguished from the absence of such an impact; force of impact associate with greater magnitude may indicate a faster speed or safety issue [tracking device is being thrown with force], or a smaller magnitude may indicate a lower speed or non-issue [tracking device is bumped]), a frequency of the motion (e.g., when motion may be intermittent or exhibit a repetitive motion such as rocking or swinging).

In response to detecting that the tracking device 108 has changed from a state of rest to a state of motion, the tracking device 108 monitors the time duration for which the tracking device 108 remains in motion. For example, the tracking device 108 determines the date and time when the tracking device 108 changes from a state of rest to a state of motion, which is determined to be a start time or an initial time, and then monitors that relative to the current date and time to measure the time duration of the motion from that start/initial time. By monitoring the time duration of the motion, the tracking device 108 can determine whether it is in motion for a time duration that meets or exceeds a time duration threshold. The time duration threshold can be configured so that the tracking device 108 can differentiate between inadvertent motion, such as a purse being jostled (i.e., a relatively short time duration of motion), and intentional motion, such as a person walking or running while carrying the purse (i.e., a relatively long time duration of motion). In another example, the time duration threshold can be configured so that the tracking device 108 can differentiate between inadvertent motion, such as a bicycle falling over onto the ground near the bike rack and becoming stationary (i.e., a relatively short time duration of motion), and intentional motion, such as the bicycle being used to travel (i.e., a relatively long time duration of motion). As such, the time duration threshold can be configured as optimized or customized for the item to be tracked by the tracking device 108, such that the time duration threshold can operate using default values that are specific to a particular item type (e.g., purse versus a bicycle), or value(s) that are manually input and customized for a particular item. The time duration threshold may be customized and/or configured though a computer application, for example, that operates on a user device, where that user device can communicate with the tracking device 108, as further discussed herein. Accordingly, in aspects, the tracking device 108 determines whether the detected motion has persisted for a time duration that at least meets and/or exceeds the time duration threshold. The tracking device 108 may use a timer or clock to measure the lapse in time from the initial detection of the motion at least up until the time duration is met, at which point the tracking device 108 may initiate and/or perform further actions, as further discussed herein.

In response to determining that the time duration threshold has been met, the tracking device 108 can reference a plurality of configurations, such as communication configurations. The plurality of configurations may be stored locally in memory 114 of the tracking device 108. The configurations can define specifics of how the tracking device 108 behaves when its motion at least meets the time duration threshold. For example, the configurations can define and/or govern specific operations to perform, a specific sequence for performing the operations, particular measurements to obtain (e.g., via one or more sensors), specific communication(s) to generate and send, as well as the data to be encoded therein. For example, when the time duration threshold is at least met, the plurality of configurations may be used to guide the tracking device 108 in a location tracking protocol for the item associated with the tracking device 108.

The plurality of configurations may instruct and cause the tracking device 108 to wirelessly scan and query to determine whether a particular user device, such as user device 110, is in range, e.g., determine whether a particular user device is nearby using a short-range wireless connection. Using Bluetooth® and/or NFC, for example, to attempt to locate and connect to a particular user device may be, in some aspects, a default selection, as such communication uses relatively lower power resources that do not drain the power supply of the tracking device 108 compared to other connections further discussed here. For example, the tracking device 108 may determine whether the user device 110 that is known by the tracking device 108 and/or that has been paired to the tracking device 108, e.g., using a short-range wireless connection, is within range of the tracking device 108. Information for identifying and connecting to the user device 110 may be stored in memory of the tracking device 108, and thus can be utilized by the tracking device 108 to scan for and attempt to connect to the user device 110. When the tracking device 108 is within range of the user device 110, the tracking device 108 may connect automatically to the user device 110, for example. When connected, the tracking device 108 can automatically notify the user device 110 of the current location of the tracking device 108, and thus the associated item (now shown in FIG. 1). When the tracking device 108 is within range of the user device 110, the tracking device 108 and the item are physically accounted for and are determined to inherently be in proximity to the user device 110 based on the direct connection, for example, using a short-range wireless connection.

When the tracking device 108 is not within range of the user device 110 (i.e., the particular user device is not found), the tracking device 108 determines that it (and thus the associated item) may not be in proximity to the user device 110 and further actions should be made with regard to the location tracking protocol. Therefore, in response to the tracking device 108 determining that it is not within range of the user device 110 but the tracking device 108 has detected sufficient motion relative to the time duration threshold, the tracking device 108 can reference the plurality of configurations in order to identify further actions to take in accordance with the location tracking protocol. In other words, the tracking device 108 may initiate further actions for tracking the associated item, as someone may be, for example, stealing, removing, or absconding with the associated item. In this manner, the tracking device 108 can utilize one or more of the sensors 111 for tracking and reporting purposes with regard to the associated item by sending communications to request that a recipient device (e.g., the user device 110 and/or other device[s]) is notified of the tracking, at any interval of time.

In aspects, the plurality of configurations may instruct and cause the tracking device 108 to measure the power supply 120, e.g., a total amount of battery power remaining, as part of the location tracking protocol. (Although discussed as occurring after an attempt to locate the user device 110, measuring the power supply 120 may be performed before the connection attempt and/or concurrently with such a connection attempt.) The tracking device 108 may utilize the power supply measurement information to select the particular actions to undertake in accordance with the location tracking protocol. For example, the plurality of configurations may instruct and cause the tracking device 108 to scan for a plurality of network types to scan for and determine which network types are in range. The plurality of configurations may instruct and cause the tracking device 108 to preferentially communicate with and/or connect to some network types before attempting to communicate with and/or connect to other network types when communications and/or connections to those network types requires less power supply consumption than other network types. Only network 102 is shown in FIG. 1 for simplicity alone, though multiple networks of different types, protocols, ranges, and coverage areas are contemplated to be within the scope of the invention.

For example, the plurality of configurations may specify and instruct the tracking device 108 to preferentially communicate to and/or connect to a first network type when that first network type is available (e.g., in range), over other network types. In one example, the first network type is an NFC connection, a mobile hotspot, and/or a Wi-Fi network. The plurality of configurations may additionally specify and instruct the tracking device 108 to preferentially communicate to and/or connect to a second network type when the first network type is determined to be unavailable. In one example, the second network type is a telecommunications network. Further, the plurality of configurations may specify and instruct the tracking device 108 to preferentially communicate to and/or connect to a third network type when the first and second network types are determined to be unavailable, and so on. In one such example, the third network type is a satellite network. The plurality of configurations may thus define and specify a preferential hierarchy that the tracking device 108 can utilize when attempting to make communications and/or connections, and in a manner that ensures the power supply of the tracking device 108 is used efficiently.

To illustrate, based on the plurality of configurations, the tracking device 108 can determine whether it is in range for a short-range wireless connection with the user device 110 to which the tracking device is paired, as previously discussed. In response to determining that the tracking device 108 is not in range for the short-range wireless connection with the user device 110 to which the tracking device 108 is/has been paired, the tracking device 108 can determine that it will generate and communicate an update request, for example, using a network or communication method. In this manner, the tracking device 108 determines what network types are in range. For example, when the tracking device 108 determines that it is not in range for a short-range wireless connection, the tracking device 108 determines whether the tracking device 108 is in range with a Wi-Fi network. When the tracking device 108 determines it is not in range for a short-range wireless connection and is not in range for a Wi-Fi network, the tracking device 108 determines it is in range (e.g., physically within a service coverage area) of a telecommunications network.

In this manner, the tracking device 108 preferentially selects a short-range wireless connection initially, but when such an option is unavailable, the tracking device 108 preferentially selects a Wi-Fi network (e.g., instead of a telecommunications network) over which an update request is to be communicated. A Wi-Fi network may be selected even when both the Wi-Fi network and a telecommunications network are both in range, in some aspects. When a short-range wireless connection and a Wi-Fi network are unavailable, the tracking device 108 may preferentially select a telecommunications network over which an update request is to be communicated, for example, over a satellite network. Further, when the short-range wireless connection, Wi-Fi, and telecommunications are unavailable, the tracking device 108 selects a satellite network over which an update request is to be communicated. Alternatively, with regard to the various aspects discussed, the tracking device 108 may select whichever network is determined to have the strongest signal or highest signal quality when multiple network types are available, independent of the power resources to be utilized to communicate using that network relative to other networks.

Once the network has been selected by the tracking device 108, the tracking device 108 generates an update request. Accordingly, the update request is initiated when the tracking device 108 is not within range (i.e., is outside of a range) of the user device 110, after the time duration threshold is met by the motion, and after selecting a network based on the plurality of configurations. The update request can be used to trigger location sharing of the tracking device 108 with other devices and/or using various networks. For example, the update request can be communicated to the cloud-based server 104 along with location information and other data, which triggers the cloud-based server 104 to provide up-to-date location tracking of the item to the user device 110, and/or other recipient device(s). As such, the update request is configured to cause the cloud-based server 104 to generate and communicate a notification to the user device 110 and/or other recipient device(s). In this manner, the location of the tracking device 108 acts as a proxy for the item being tracked. For example, the update request is communicated from the tracking device 108 to the cloud-based server 104 using a Wi-Fi network, to a telecommunications network, or to a satellite network, depending on their availability, with the selection(s) made by the tracking 108 based on the plurality configurations, availability of the power source 120, signal strength/quality of in-range network(s), and/or any combination thereof.

As such, in various embodiments, based on the plurality of configurations and one or more measurements of the power supply 120, the tracking device 108 determines that it will communicate one or more update request(s) with location information (e.g., current GPS coordinates determined by the GPS 118 and/or near real-time location identifiers), sensor data from the sensor(s) 111, and the like to the cloud-based server 104. For example, based on the remaining power in the power supply 120 relative to the amount of power utilized by the tracking device 108 to communicate the update request over the selected network, the tracking device 108 dynamically determines a quantity of update request(s) to be communicated and an interval of update request(s) to be communicated. In one example, communicating an update request using a Wi-Fi network uses a relatively lower amount of power from the power supply 120, such that the tracking device 108 can determine the increase in the quantity of update request(s) and/or an interval of update request(s) that it can generate and communicate to the cloud-based server 104 when the power supply 120 is adequate (e.g., based on measurement[s] relative to thresholds or ranges defined by the configurations). In another example, communicating an update request using a telecommunications network uses a relatively moderate amount of power from the power supply 120, such that the tracking device 108 can determine a specific quantity of update requests and/or an interval of update requests that it can generate and communicate to the cloud-based server 104 when the power supply is adequate (e.g., based on measurement[s] relative to thresholds or ranges defined by the configurations). In yet another example, communicating an update request using a satellite network uses a relatively high amount of power from the power supply 120, such that the tracking device 108 can determine a lesser quantity of update requests and/or an interval of update requests that it can generate and communicate to the cloud-based server 104 when the power supply is adequate (e.g., based on measurement[s] relative to thresholds or ranges defined by the configurations). Thus, depending on the available remaining power supply, the tracking device 108 can select an optimized and specific quantity of update request(s) and/or an interval of update request(s) for the selected network. In further aspects, depending on the available remaining power supply, the tracking device 108 can select an optimized and specific quantity of update request(s) and/or an interval of update request(s) to be sent over multiple networks of different types (e.g., send one update request over an in-range telecommunications network and send multiple, periodic update requests over an in-range Wi-Fi network).

In various embodiments, the update requests are communicated based on the motion/time duration thresholds and the absence of the particular user device. Additionally, in some aspects, the tracking device 108 generates and communicates a polling message to the cloud-based server 104 using a polling time interval specified by and/or based on the plurality of configurations, and using one or more available networks or communication methods discussed herein. The polling message may be, for example, a daily reporting of the location of the tracking device 108 when stationary, which signals that the tracking device 108 is operational and accounted for. As such, the tracking device 108 can send one or more polling messages to the cloud-based server 104 using a polling time interval specified by the plurality of configurations, in various aspects.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1 may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 2:
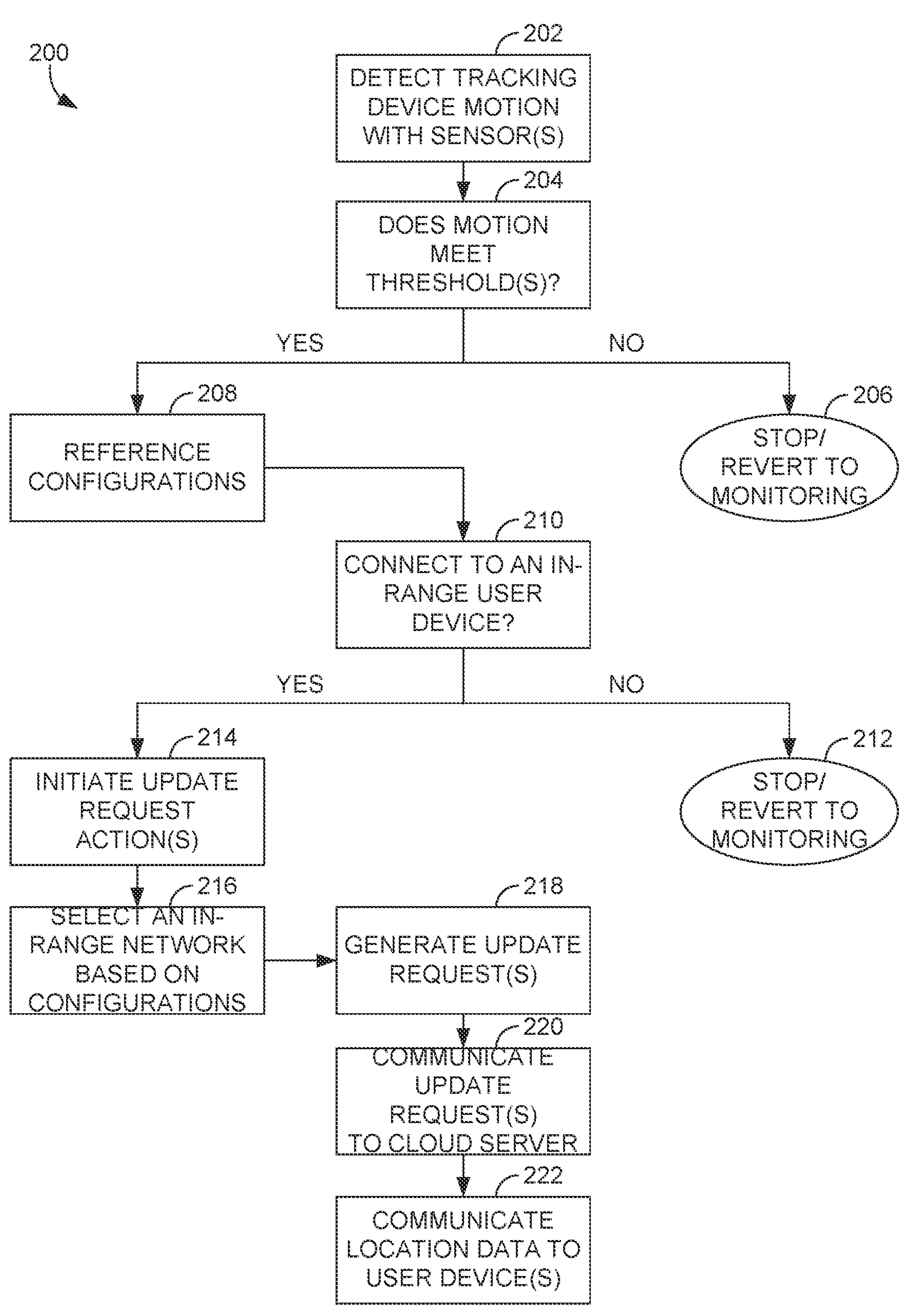
FIG. 2 depicts a flowchart for operations performed by components of the system of FIG. 1, in accordance with one or more aspects.

Moving to FIG. 2, a flowchart is shown that depicts operations performed by components of the system of FIG. 1, in accordance with one or more aspects. In some embodiments, the method 200 can be a computer-implemented method. In one embodiment, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200, in embodiments. As discussed below, the method 200 can be performed using software, hardware, component(s), and/or device(s) depicted in the example of FIG. 1.

At 202, the tracking device is determined to be in motion using a sensor of the tracking device. At 204 it is determined whether the tracking device is in motion for a time duration that meets a time duration threshold. In response to determining that the time duration threshold is not met, the tracking device may determine to halt the location protocol and to not initiate a request, shown at 206. In response to determining that the time duration threshold is or has been met, that tracking device references a plurality of configurations at 208.

At 210, the tracking device determines, based on the plurality of configurations, whether the tracking device is in range for a short-range wireless connection with a user device to which the tracking device is paired. Additionally, in some aspects, the tracking device may further determine whether it is in range to a Wi-Fi network and/or a telecommunications network. In response to determining that the tracking device is in range for the short-range wireless connection with the user device to which the tracking device is paired, the tracking device determines to halt the location protocol and to not initiate a request at 212. In response to determining that the tracking device is not in range for the short-range wireless connection with the user device to which the tracking device is paired, the tracking device determines to initiate an update request at 214.

At block 216, based on the plurality of configurations, the tracking device selects one of a Wi-Fi network or a telecommunications network for communicating the update request. As the tracking device is determined to not be in range for the short-range wireless connection, the tracking devices will determine whether it can connect to an in-range Wi-Fi network. For example, the tracking device may preferentially select a Wi-Fi network, even when that Wi-Fi network and a telecommunications network are both in range, based on the plurality of configurations. In such an example, the configuration can specify that the tracking device should select a Wi-Fi network before a telecommunications network. In another example, when the tracking device is determined to not be in range for the short-range wireless connection and is determined to not be in range for the Wi-Fi network, the tracking device can determine whether it is in range for the telecommunications network. For example, the configuration can specify that the tracking device should select a telecommunications network before a satellite network when short-range wireless connections and Wi-Fi networks are unavailable. In an example, the configuration can specify that the tracking device should select a satellite network when short-range wireless connections, Wi-Fi networks, and telecommunications networks are unavailable. As such, the tracking device may select a Wi-Fi network, a telecommunications network, or even a satellite network, using a hierarchy specified in the configurations.

At 218, the tracking device generates an update request, and communicates at 220 that update request from the tracking device to a cloud-based server using the selected network (e.g., Wi-Fi, telecommunications, or satellite). The update request is configured to cause the cloud-based server to automatically generate and communicate a notification, and further, to communicate that notification to one or more user devices at 222. The notification, in various aspects, includes the location of the tracking device, and by physical association, the item being tracked. The one or more user devices may be associated with the tracking device and/or a user account that is linked to the tracking device. Based on the configurations and the power supply remaining, the tracking device may take further actions to communicate one or more update requests to the cloud-based server, for example, to provide location tracking updates and/or near real-time location tracking of the tracking device and the associated item.

Figure 3:
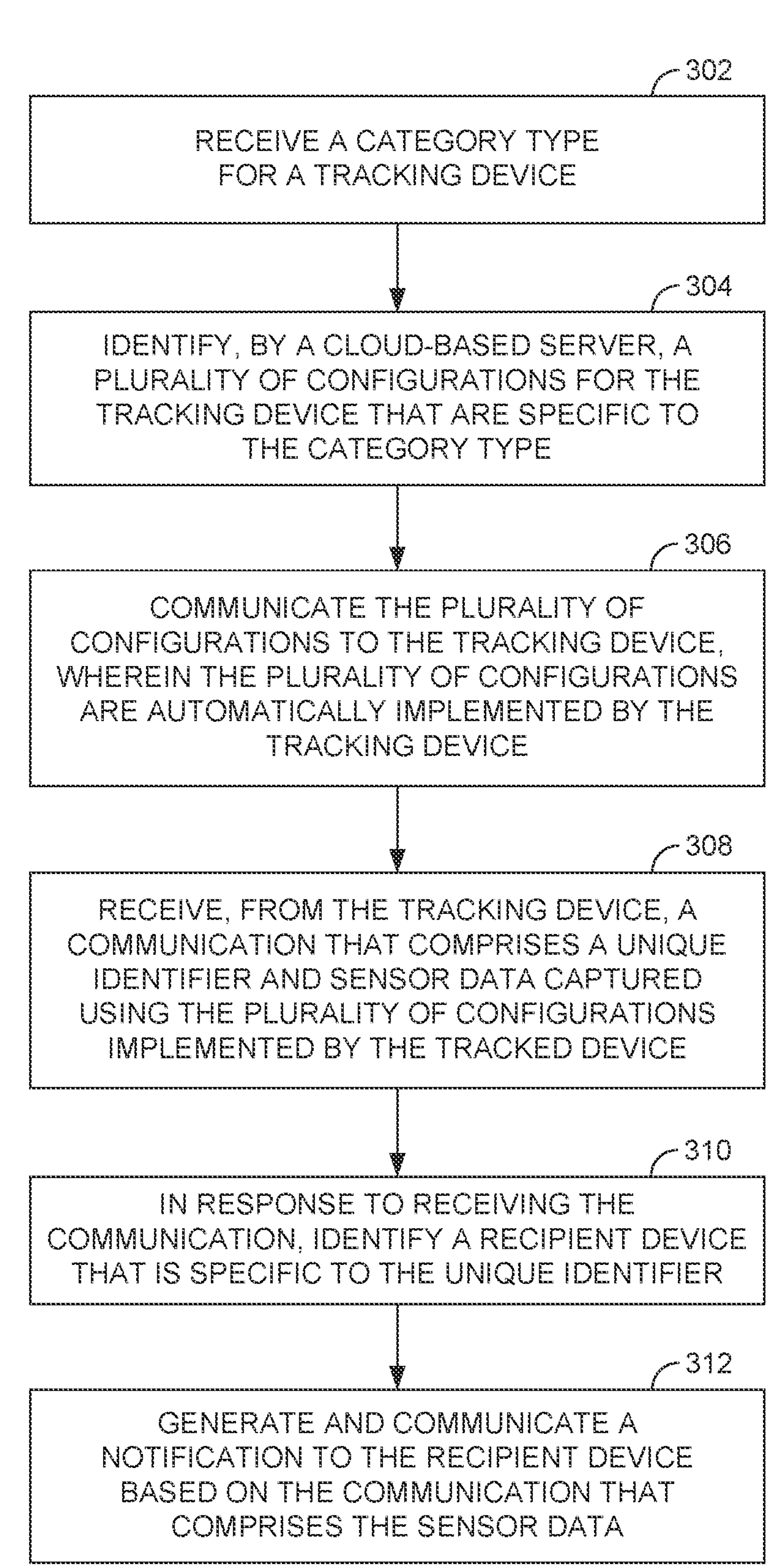
FIG. 3 is a flowchart for an example method, in accordance with one or more aspects.
Figure 4:
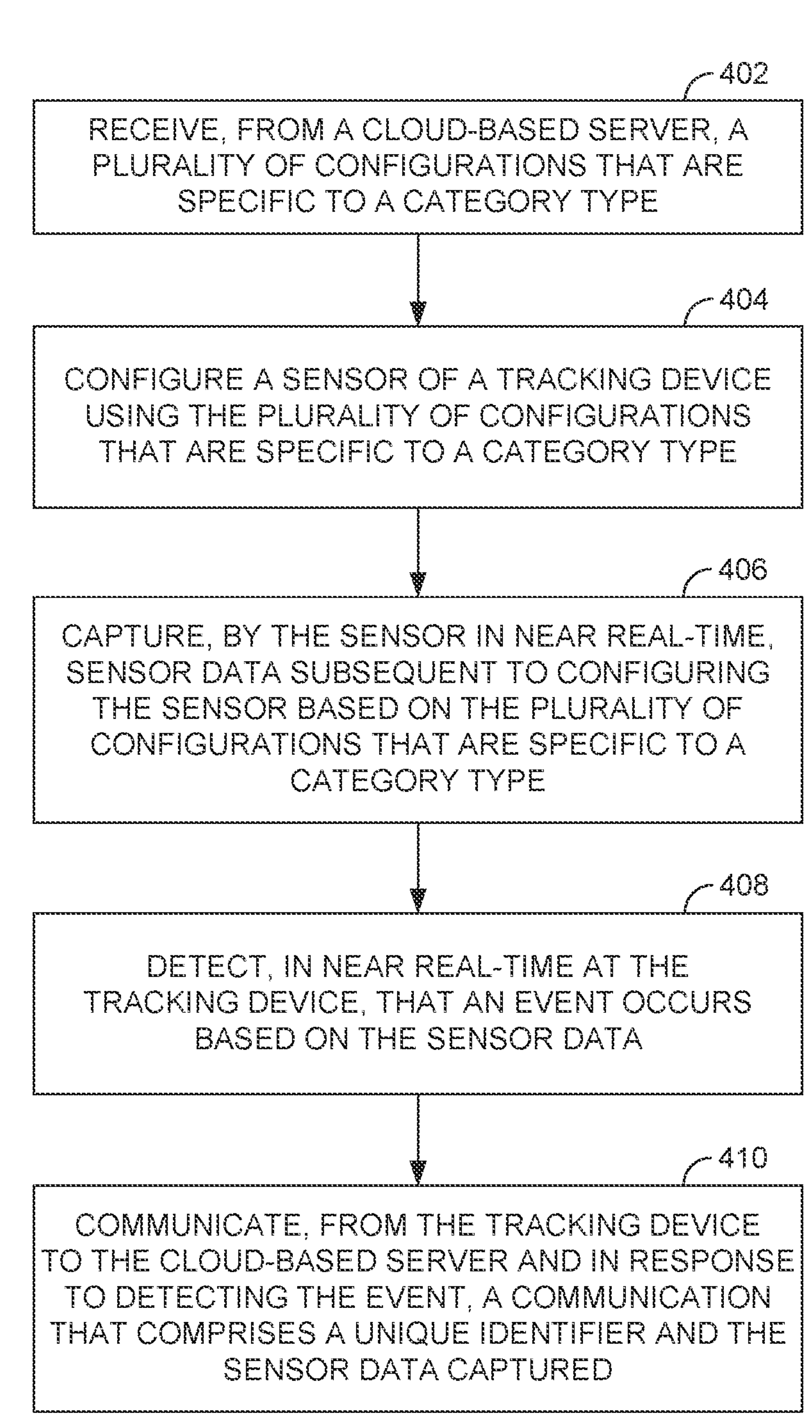
FIG. 4 is a flowchart for another example method, in accordance with one or more aspects.

Turning to FIGS. 3 and 4, flowcharts are depicted for example methods. In some embodiments, the methods can be computer-implemented methods. In one embodiment, one or more non-transitory computer-readable storage media having computer-readable instructions or computer-readable program code portions embodied thereon, for execution via one or more processors, can be used to implement and/or perform the methods. For example, computer-readable instructions or computer-readable program code portions can specify the performance of the methods, can specify a sequence of steps of the methods, and/or can identify particular component(s) of software and/or hardware for performing one or more of the steps of the methods, in embodiments. As discussed below, the methods can be performed using software, hardware, component(s), and/or device(s) depicted in the example of FIG. 1.

With regard to FIG. 3, the method 300 shown is associated with, implemented by, and/or performed by a server, such as the cloud-based server 104 of FIG. 1. At block 302, a category type for a tracking device is received. For example, input from a user device, such as user device 110 of FIG. 1, may specify that a tracking device is to be configured to operate and function with specific tracking operations, designated by types. Examples category types include safety types, security types, and tracking types. For example, a safety type may include configurations for detecting temperature minimums and maximums that can be used to trigger and communicate notifications and/or alerts to ensure the safety of a beloved pet. A security type, for example, may include configurations for detecting when an object, such as luggage, has been tampered with when someone opens the luggage, and further, can be used to communication notifications and/or alerts. In another example, a tracking type may monitor the near real-time location of a bicycle, and through it, the location of a child who rides that bicycle, and further, can be used to trigger and communicate notifications and/or alerts. It will be understood that more than one category type may be applicable concurrently. In one example, a tracking type may monitor the near real-time location of a bicycle, and further, a safety type may concurrently monitor to detect potential injury through a bicycle accident based on configurations with regard to measurements of the accelerometer, impacts sensors, and/or shock sensors. As such, if user input specifies that the tracking device is to be used for a bicycle, user input may specify that both location and accident monitoring are desired. Based on the user input indicating how the tracking device is to be utilized, the cloud-based server, for example, receives that indication, which specifies that the tracking device is both a safety type and a monitoring type.

At block 304, the cloud-based server identifies a plurality of configurations for the tracking device that are specific to the category type(s). In various aspects, the plurality of configurations includes a default value that is identified by the cloud-based server as specific to the category type. Additionally or alternatively, the plurality of configurations includes a user-defined customized value, for example, a customized value for a threshold that is based on user input. In some aspects, the cloud-based server identifies the tracking device as being associated with a particular user, for example, based on a unique user identifier, a unique user device identifier, and/or other unique identifiers that may be associated with a particular account.

In some aspects, the cloud-based server may receive an indication of a reference location for a tracking device. For example, the reference location may be associated with a user account and/or may indicate a general geographic area (e.g., city, zip code, metropolitan area, regional area, geofenced area) where the tracking device is to be utilized. In such an aspect, the cloud-based server identifies one or more configurations that are specifically identified for that reference location. In various aspects, generally, the plurality of configurations are encoded into a data packet prior to communicating the plurality of configurations to the tracking device. Continuing to block 306, the plurality of configurations are communicated to the tracking device, wherein the plurality of configurations are automatically implemented by the tracking device. Upon receipt, the plurality of configurations are utilized by the tracking device and implemented, for example, via one or more sensors and one or more thresholds in order to monitor for safety, security, and/or tracking purpose, in accordance with the category type and/or any other values/user input.

At block 308, the cloud-based server receives a communication from the tracking device that comprises a unique identifier and sensor data, as captured using the plurality of configurations implemented by the tracked device. The communication may include an update request, as discussed previously. In response to receiving the communication, a recipient device that is specific to the unique identifier is identified at block 310. The unique identifier may be linked to the recipient device, a user account, or the like, in order to associate the data from the tracking device as intended for communication to the recipient device, wherein the association may be direct or indirect. Subsequent to receipt of the communication from the tracking device that comprises the unique identifier and the sensor data, the cloud-based server may determine that it will generate a notification based on the sensor data, the category type, at least one of the plurality of configurations, or any combination thereof. The communication may include location information for the tracking device, a unique identifier of the tracking device, a unique identifier of the recipient device(s), the sensor data (e.g., measurements of temperature, impact, speed, GPS coordinates and the like), indicators of the sensor data (e.g., impact detected; high temperature detected; location has exceeded a geo-fence, etc.), indicators of a safety, security, and/or tracking alert (e.g., theft detected; emergency detected, etc.) based on the sensor data, or any combination thereof.

At block 312, a notification is generated and communicated to the recipient device based on the communication that comprises the sensor data. The notification may be routed from the cloud-based server to a telecommunications backhaul and through the telecommunications network to the recipient device, such as the user device 110. In some aspects, a plurality of notifications are generated and communicated to a plurality of recipients devices using one or more methods, such as an automated telephone call, a text-based or SMS message, an email, and/other alert.

With regard to FIG. 4, the method 400 shown is associated with, implemented by, and/or performed by a tracking device, such as the tracking device 108 of FIG. 1. At step 402, a plurality of configurations that are specific to a category type are received from a cloud-based server. When received by a tracking device, the tracking device operates to automatically reconfigure itself and the sensor(s) in response to receiving the plurality of configurations that are specific to the category type. Subsequent to receiving the plurality of configurations that are specific to a category type, the tracking device may determine whether and when an existing configuration of the tracking device, the sensor(s), or a combination thereof should be modified. In such an example, based on and/or by utilizing at least one of a plurality of configurations, the tracking device may reconfigure the existing configuration of the tracking device, the sensor(s), or a combination thereof. At block 404, a sensor of the tracking device is configured using the plurality of configurations that are specific to a category type. At block 406, the sensor captures, in near real-time, sensor data subsequent its configuration based on the plurality of configurations that are specific to a category type. At block 408, the tracking device detects, in near real-time, whether an event occurs based on the sensor data. At block 410, the tracking device communicates a communication to the cloud-based server in response to detecting such an event, wherein the communication comprises a unique identifier and the sensor data captured.

In one example, based on the tracking device configuring itself, the tracking device causes the sensor to monitor an environment of the tracking device in order to capture the sensor data, where the sensor is a temperature sensor. In such an example, the tracking device can determine when a temperature of the environment of the tracking device at least meets a threshold defining a minimum, a maximum, or a range using the sensor data captured by the temperature sensor. The threshold is predefined by at last one of the plurality of configurations in such an example. Then, an event can be detected based on determining whether the temperature of the environment of the tracking device at least meets the threshold. Based on that event, the tracking device can communicate with the cloud-based server as described hereinabove.

In another example, based on the tracking device configuring itself, the tracking device causes the sensor to monitor an environment of the tracking device in order to capture the sensor data, wherein the sensor is an optical sensor. In such an example, the tracking device can determine when light is detected in the environment of the tracking device based on the sensor data captured by the optical sensor. The light may, for example, be detected in a binary fashion (e.g., there is light sufficient to trigger the sensor) or may at least meet a threshold defining a minimum, a maximum, or a range, wherein the threshold is predefined by at last one of the plurality of configurations. Then, an event is detected based on determining that the light of the environment of the tracking device at least meets the threshold. Based on that event, the tracking device can communicate with the cloud-based server as described hereinabove.

In yet another example, based on the tracking device configuring itself, the tracking device causes the sensor to monitor an environment of the tracking device in order to capture the sensor data, wherein the sensor is a motion sensor. In such an example, the tracking device can determine whether motion of the tracking device in the sensor data captured by the motion sensor at least meets a threshold defining a minimum, a maximum, or a range. Again, the threshold can be predefined by at last one of the plurality of configurations. Then, an event can be detected based on determining that the motion of the tracking device at least meets the threshold. Based on that event, the tracking device can communicate with the cloud-based server as described hereinabove.

In another example, based on the tracking device configuring itself, the tracking device causes a plurality of sensors to monitor an environment of the tracking device in order to capture the sensor data. The tracking device can determine, based on the sensor data captured by one or more of the plurality of sensors, whether sensor data at least meets corresponding threshold(s) that are predefined by the plurality of configurations. When one or more events are detected based on determining that the sensor data captured by the plurality of sensors for the tracking device at least meet the corresponding threshold(s), a tracking device can communicate with the cloud-based server as described hereinabove, using one or more communications to trigger notifications and/or alerts.

In yet another aspect, based on the tracking device configuring itself, the tracking device can detect when an accessory sensor is physically, electronically, and/or communicatively coupled to the tracking device. The tracking device can communicate, in response to detecting the accessory sensor, a communication to the cloud-based server that requests an additional configuration for the accessory sensor and an identifier for the accessory sensor. An additional configuration for the accessory sensor can be received from the cloud-based server in response. The tracking device can then configure the accessory sensor using the additional configuration, wherein the additional configuration is used by the accessory sensor to monitor an environment of the tracking device in order to capture additional sensor data. For example, the additional configuration may instruct the tracking device to activate a particular accessory sensor, deactivate another sensor, trigger an accessory sensor to capture information, and the like. When an event is detected or identified based on the sensor data of the additional accessory, either alone or with sensor data of other sensor(s), the tracking device can communicate with the cloud-based server as described hereinabove, to include notifications, alerts, and sensor data to the cloud-based server.

Figure 5:
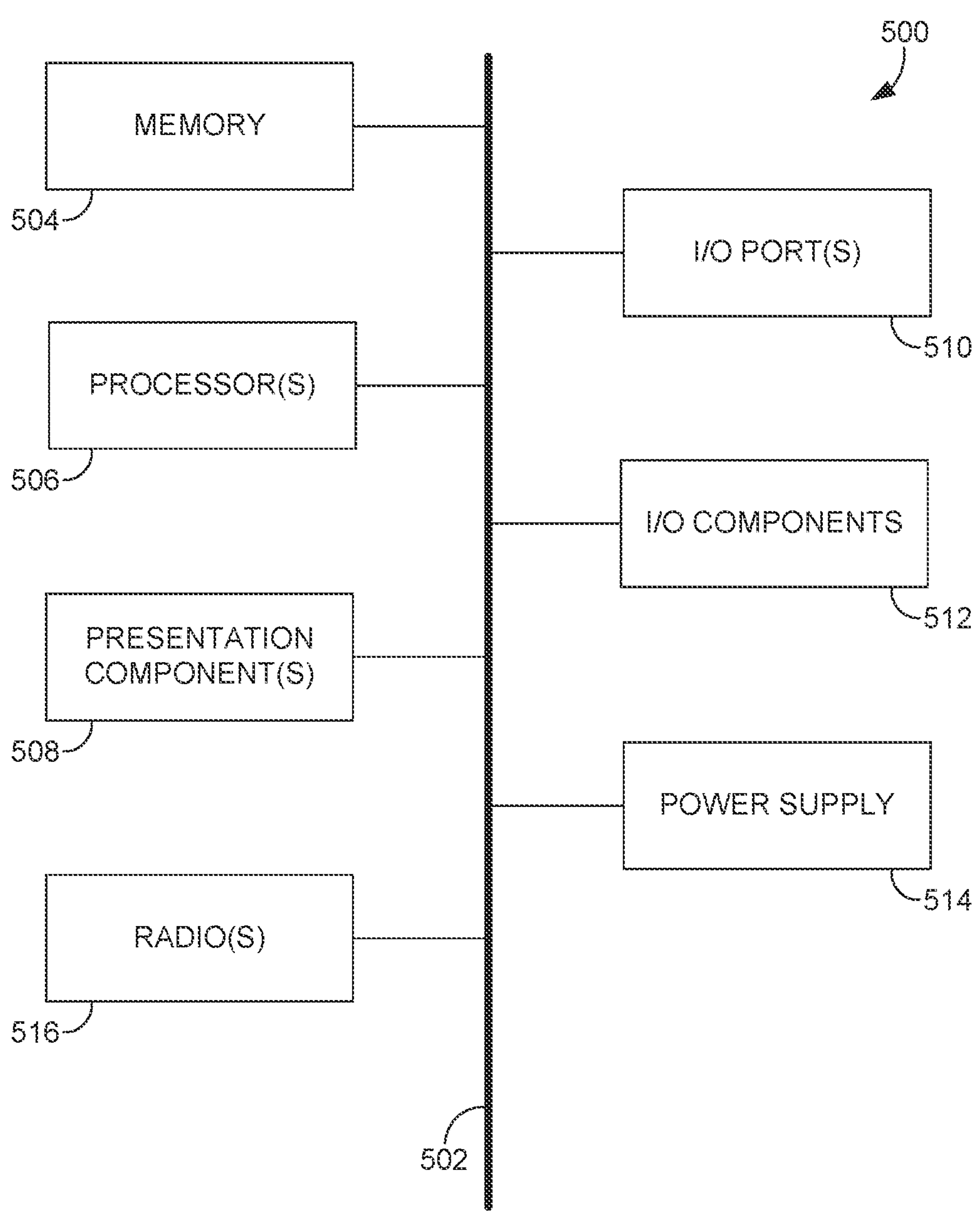
FIG. 5 is an example device suitable for use in implementations of the disclosure.

FIG. 5 illustrates an example device suitable for use in implementations of the disclosure. Computing device 500 is but one example of a suitable computing environment and is not intended to suggest any limitation as to the scope of use or functionality of the invention, and nor should computing device 500 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples with the following devices: memory 504, one or more processors 506, one or more presentation components 508, input/output (I/O) ports 510, I/O components 512, and power supply 514. Bus 502 represents what may be one or more buses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. Distinction is not made between such categories as “workstation,” “server,” “laptop,” “handheld device,” etc., as all are contemplated within the scope of FIG. 5 and refer to “computer” or “computing device.”

Computing device 500 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term “modulated data signal” indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 504 includes computer storage media in the form of volatile and/or non-volatile memory. Memory 504 may be removable, non-removable, or a combination thereof. Examples of memory include solid-state memory, hard drives, optical disc drives, etc. Computing device 500 includes one or more processors 506, which read data from various entities such as bus 502, memory 504, or I/O components 512. One or more presentation components 508 present data indications to a person or other device. Examples of one or more presentation components 508 include a display device, speaker, printing component, vibrating component, etc. I/O ports 510 allow computing device 500 to be logically coupled to other devices including I/O components 512, some of which may be built into computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VOIP communications. As can be appreciated, in various aspects the radio 516 can be configured to support multiple technologies, and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media storing instructions that when executed via one or more processors perform a computerized method, the media comprising:

receiving a category type for a tracking device, wherein the category type is selected from a safety type, a security type, and a tracking type;

identifying, by a cloud-based server, a plurality of configurations for the tracking device that are specific to the category type, wherein the plurality of configurations include sensor thresholds specific to the selected category type for detecting events associated with the category type;

communicating the plurality of configurations to the tracking device, wherein the plurality of configurations are automatically implemented by the tracking device;

receiving, from the tracking device, a communication that comprises a unique identifier and sensor data captured using the plurality of configurations implemented by the tracking device;

in response to receiving the communication, identifying a recipient device that is specific to the unique identifier; and generating and communicating a notification to the recipient device based on the communication that comprises the sensor data.

2. The one or more non-transitory computer-readable media of claim 1, further comprising:

receiving an indication of a reference location for a tracking device; and wherein one or more of the plurality of configurations are specifically identified based on the reference location.

3. The one or more non-transitory computer-readable media of claim 1, wherein the plurality of configurations includes a default value, the default value being identified as specific to the category type.

4. The one or more non-transitory computer-readable media of claim 1, wherein the plurality of configurations includes a user-defined customized value specific to the category type.

5. The one or more non-transitory computer-readable media of claim 1, further comprising:

identifying the tracking device as being associated with a particular user; and encoding the plurality of configurations into a data packet prior to communicating the plurality of configurations to the tracking device.

6. The one or more non-transitory computer-readable media of claim 5, further comprising subsequent to receipt of the communication from the tracking device that comprises the unique identifier and the sensor data, determining to generate the notification based on the sensor data, the category type, at least one of the plurality of configurations, or any combination thereof.

7. The one or more non-transitory computer-readable media of claim 1, wherein generating and communicating the notification to the recipient device comprises:

generating and communicating a plurality of notifications to a plurality of recipient devices.

8. One or more non-transitory computer-readable media storing instructions that when executed via one or more processors perform a computerized method, the media comprising:

receiving, from a cloud-based server, a plurality of configurations that are specific to a category type, wherein the category type is selected from a safety type, a security type, and a tracking type, and wherein the plurality of configurations include sensor thresholds specific to the selected category type for detecting events associated with the category type;

configuring a sensor of a tracking device using the plurality of configurations that are specific to a category type;

capturing, by the sensor in near real-time, sensor data subsequent to configuring the sensor based on the plurality of configurations that are specific to a category type;

detecting, in near real-time at the tracking device, that an event occurs based on the sensor data; and communicating, from the tracking device to the cloud-based server and in response to detecting the event, a communication that comprises a unique identifier and the sensor data captured.

9. The one or more non-transitory computer-readable media of claim 8, further comprising:

causing the sensor to monitor an environment of the tracking device in order to capture the sensor data, wherein the sensor is a temperature sensor;

determining that a temperature of the environment of the tracking device at least meets a threshold defining a minimum, a maximum or a range, wherein the threshold is predefined by at last one of the plurality of configurations; and wherein the event is detected based on determining that the temperature of the environment of the tracking device at least meets the threshold.

10. The one or more non-transitory computer-readable media of claim 8, further comprising:

causing the sensor to monitor an environment of the tracking device in order to capture the sensor data, wherein the sensor is an optical sensor;

determining that light in the environment of the tracking device at least meets a threshold defining a minimum, a maximum or a range, wherein the threshold is predefined by at last one of the plurality of configurations; and wherein the event is detected based on determining that the light of the environment of the tracking device at least meets the threshold.

11. The one or more non-transitory computer-readable media of claim 8, further comprising:

causing the sensor to monitor an environment of the tracking device in order to capture the sensor data, wherein the sensor is a motion sensor;

determining that motion of the tracking device at least meets a threshold defining a minimum, a maximum or a range, wherein the threshold is predefined by at last one of the plurality of configurations; and wherein the event is detected based on determining that the motion of the tracking device at least meets the threshold.

12. The one or more non-transitory computer-readable media of claim 8, further comprising:

causing a plurality of sensors to monitor an environment of the tracking device in order to capture the sensor data;

determining that the sensor data captured by the plurality of sensors for the tracking device at least meets corresponding thresholds that are predefined by the plurality of configurations; and wherein the event is detected based on determining that the sensor data captured by the plurality of sensors for the tracking device at least meet the corresponding thresholds.

13. The one or more non-transitory computer-readable media of claim 8, further comprising:

subsequent to receiving the plurality of configurations that are specific to a category type, determining that an existing configuration of the tracking device, the sensor, or a combination thereof should to be modified; and using at least one of a plurality of configurations, reconfiguring the existing configuration of the tracking device, the sensor, or a combination thereof.

14. The one or more non-transitory computer-readable media of claim 8, further comprising:

detecting an accessory sensor;

communicating, from the tracking device to the cloud-based server and in response to detecting the accessory sensor, a communication that requests an additional configuration for the accessory sensor and an identifier for the accessory sensor; and receiving, from the cloud-based server, the additional configuration for the accessory sensor; and configuring, by the tracking device, the accessory sensor using the additional configuration, wherein the additional configuration is used by the accessory sensor to monitor an environment of the tracking device in order to capture additional sensor data.

15. The one or more non-transitory computer-readable media of claim 8, wherein the tracking device operates to automatically reconfigure itself and the sensor in response to receiving the plurality of configurations that are specific to the category type.

16. A system comprising:

a tracking device having one or more processors; and a cloud-based server operating within a telecommunications network, the cloud-based server configured to:

receiving a category type for a tracking device, wherein the category type is selected from a safety type, a security type, and a tracking type;

identifying, by a cloud-based server, a plurality of configurations for the tracking device that are specific to the category type, wherein the plurality of configurations include sensor thresholds specific to the selected category type for detecting events associated with the category type;

communicating the plurality of configurations to the tracking device, wherein the plurality of configurations are automatically implemented by the tracking device;

receiving, from the tracking device, a communication that comprises a unique identifier and sensor data captured using the plurality of configurations implemented by the tracked device;

in response to receiving the communication, identifying a recipient device that is specific to the unique identifier; and generating and communicating a notification to the recipient device based on the communication that comprises the sensor data.

17. The system of claim 16, wherein the tracking device is configured to, via the one or more processors:

causing the sensor to monitor an environment of the tracking device in order to capture the sensor data, wherein the sensor is a temperature sensor;

determining that a temperature of the environment of the tracking device at least meets a threshold defining a minimum, a maximum or a range, wherein the threshold is predefined by at last one of the plurality of configurations; and wherein the event is detected based on determining that the temperature of the environment of the tracking device at least meets the threshold.

18. The system of claim 16, wherein the tracking device is configured to, via the one or more processors:

causing the sensor to monitor an environment of the tracking device in order to capture the sensor data, wherein the sensor is an optical sensor;

determining that light in the environment of the tracking device at least meets a threshold defining a minimum, a maximum or a range, wherein the threshold is predefined by at last one of the plurality of configurations; and wherein the event is detected based on determining that the light of the environment of the tracking device at least meets the threshold.

19. The system of claim 16, wherein the tracking device is configured to, via the one or more processors:

causing a plurality of sensors to monitor an environment of the tracking device in order to capture the sensor data;

determining that the sensor data captured by the plurality of sensors for the tracking device at least meets corresponding thresholds that are predefined by the plurality of configurations; and wherein the event is detected based on determining that the sensor data captured by the plurality of sensors for the tracking device at least meet the corresponding thresholds.

20. The system of claim 16, wherein the tracking device is configured to, via the one or more processors:

detecting an accessory sensor;

communicating, from the tracking device to the cloud-based server and in response to detecting the accessory sensor, a communication that requests an additional configuration for the accessory sensor and an identifier for the accessory sensor; and receiving, from the cloud-based server, the additional configuration for the accessory sensor; and configuring, by the tracking device, the accessory sensor using the additional configuration, wherein the additional configuration is used by the accessory sensor to monitor an environment of the tracking device in order to capture additional sensor data.

* * * * *